US006042082A

United States Patent [19]

Graner et al.

[11] Patent Number: 6,042,082

[45] Date of Patent: Mar. 28, 2000

[54] ELECTROMAGNETICALLY ACTUATED VALVE

[75] Inventors: Jürgen Graner, Sersheim; Andreas Eichendorf, Schorndorf; Thomas Sebastian, Stuttgart, all of Germany

[73] Assignee: Robert Bosch GmbH, Stuttgart, Germany

[21] Appl. No.: 09/297,797

[22] PCT Filed: Jun. 30, 1998

[86] PCT No.: PCT/DE98/01788

§ 371 Date: May 6, 1999

§ 102(e) Date: May 6, 1999

[87] PCT Pub. No.: WO99/13211

PCT Pub. Date: Mar. 18, 1999

[30] Foreign Application Priority Data

Sep. 9, 1997 [DE] Germany ........................... 197 39 324

[51] Int. Cl.$^{7}$ ..................................................... F16K 31/02

[52] U.S. Cl. ................................ 251/129.21; 251/129.18; 239/585.1

[58] Field of Search ......................... 251/129.21, 129.18; 239/585.1

[56] References Cited

U.S. PATENT DOCUMENTS

| | | | |
|---|---|---|---|
| 5,236,174 | 8/1993 | Vogt et al. | 251/129.21 |
| 5,373,992 | 12/1994 | Reiter . | |
| 5,494,225 | 2/1996 | Nally et al. | 239/585.5 |

FOREIGN PATENT DOCUMENTS

| | | |
|---|---|---|
| 40 03 227 | 1/1991 | Germany . |
| 1 95 03 820 | 8/1996 | Germany . |
| 1 95 03 821 | 8/1996 | Germany . |

*Primary Examiner*—Kevin Shaver
*Assistant Examiner*—John P. Welsh
*Attorney, Agent, or Firm*—Kenyon & Kenyon

[57] ABSTRACT

An electromagnetically operated valve, in particular a fuel injection valve for fuel injection systems, has a core surrounded by a magnet coil and an armature adjacent to the core for operating a valve closing body that interacts with a valve seat body. A reflux body surrounding the armature is magnetically isolated from the core by an isolation point. The core and/or the reflux body is made of a ferritic or ferromagnetic material whose permeability depends on the mechanical stress in the material. The core and/or the reflux body is mechanically deformed in a boundary area between the core and the reflux body to form the magnetic isolation point.

8 Claims, 3 Drawing Sheets

ELECTROMAGNETICALLY ACTUATED VALVE

FIELD OF THE INVENTION

The present invention relates to an electromagnetically operated valve, in particular a fuel injection valve for fuel injection systems in internal combustion engines.

BACKGROUND INFORMATION

German Patent No. 40 03 227 discloses a fuel injection valve with a tubular core surrounded by a magnet coil. An armature which is connected to a valve closing body that interacts with a valve seat is connected to the spray end of the core. The valve seat is formed on a valve seat body which is held in a tubular valve seat carrier. The valve seat body serves at the same time as a component for the magnetic reflux of the magnetic flux circuit. For this purpose, the valve seat carrier surrounds the armature like a sleeve on the end opposite the spray end and guides the magnetic reflux radially to a guide element which connects the valve seat carrier to the core axially and thus closes the magnetic flux circuit. To prevent a magnetic short circuit between the core and the valve seat carrier serving as reflux body, the valve seat carrier is isolated from the core by a nonmagnetic intermediate part designed as a metallic valve inside tube. Therefore, the magnetic flux does not travel directly from the core into the valve seat carrier, but instead it intentionally follows an indirect path through the armature, so an axial force component is exerted on the armature to open the fuel injection valve when the magnet coil is electrically energized.

However, the design of the metallic intermediate part as an additional turned part requires an additional manufacturing expense and an additional assembly expense. The core, the valve seat carrier and the nonmagnetic intermediate part are manufactured as turned parts and must be joined by two welds. The welds also serve to provide the hydraulic seal, so that fuel is prevented from entering the annular space holding the magnet coil. Therefore, special demands must be made of the quality of the welds, and a simplified welding method such as a spot welding method cannot be used. Furthermore, eddy currents which would have a negative effect on the efficiency of the electromagnetic operation of the valve can occur in the nonmagnetic metallic intermediate part.

German Patent No. 195 03 821 has already proposed that the core and the valve seat carrier be designed as a one-piece part. The magnetic isolation between the core and the valve seat carrier is achieved by a magnetic throttle point. The one-piece combined component forming the core and the valve seat carrier is designed with an extremely small wall thickness of 0.2 mm, for example, in the area of the throttle point. When the magnet coil is magnetically energized, a saturation flux density is achieved in this area, so that the magnetic flux is throttled, and the magnetic flux exceeding the saturation flux density of the throttle point travels from the core to the armature and into the valve seat carrier. Due to the small wall thickness in the area of the magnetic throttle point, however, the mechanical stability of the combined part forming the core and the valve seat carrier is impaired, so that assembly requires great caution and precision. The saturation flux density occurring at the throttle point is essentially unavailable for the magnetic operation of the armature and thus it has a negative effect on the efficiency of the electromagnetic operation. The current flux in the magnet coil must be increased accordingly, and the resulting thermal power loss must also be dissipated.

SUMMARY OF THE INVENTION

The electromagnetically operated valve according to the present invention has the advantage over the related art that the magnetic isolation point between the core and the reflux body is implemented in a simple manner by mechanically deforming the ferritic or ferromagnetic material of the core and of the reflux body in the area of the isolation point. The isolation point may have a relatively great wall thickness, so that no mechanical instability occurs at the magnetic isolation point. Due to the simple design of the magnetic isolation point, the assembly and manufacturing costs are greatly reduced. Automatic or semiautomatic manufacture is possible.

The mechanical deformation in the area of the isolation point can be produced in an especially advantageous manner by plastic deformation, with the material being under an inherent mechanical stress in the area of the isolation point. The plastic deformation can be implemented, for example, by suitable pressing, caulking or stamping in an automatic manufacturing process.

It is also especially advantageous to design the core and the reflux body as a one-piece combined part and to implement the magnetic isolation point by plastic deformation on the one-piece combined part. The assembly and manufacturing costs are minimized in this embodiment. An annular recess surrounding the armature may be designed on the one-piece combined part in the area of the plastically deformed magnetic isolation point to prevent the isolation point from interfering with the guidance of the armature in the reflux body surrounding the armature. The isolation point may extend axially beyond a gap provided between the core and the armature to ensure that the armature will stop against the spray end of the core and not the plastically deformed isolation point, and therefore the valve lift is not impaired by the plastically deformed isolation point.

DETAILED DESCRIPTION

Figure 1:
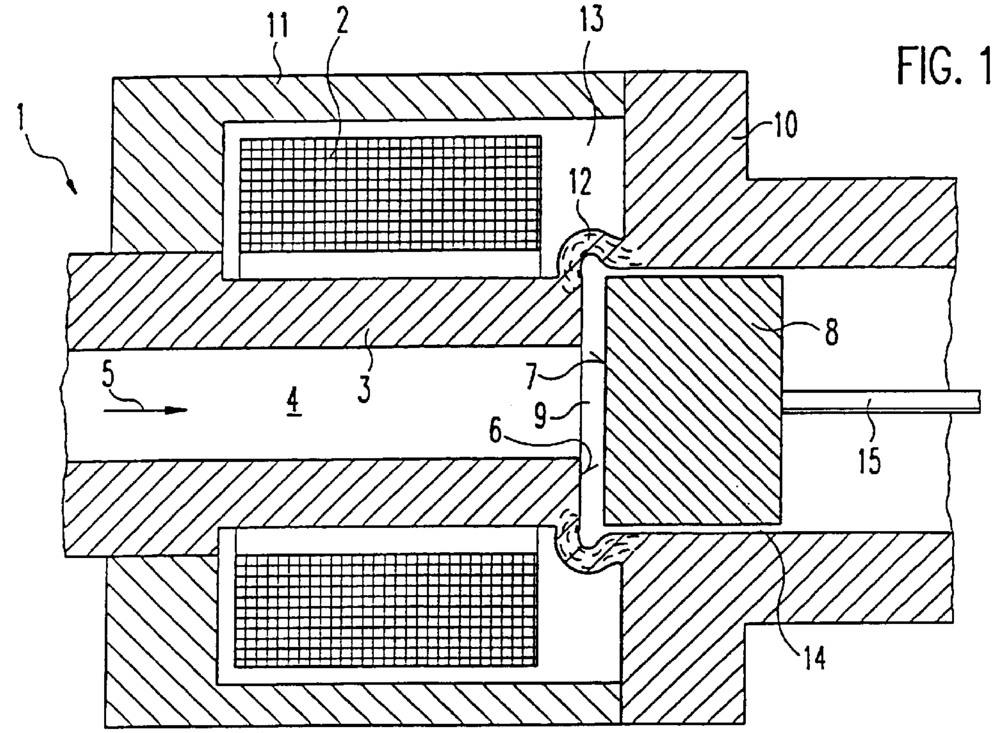
FIG. 1 shows a first exemplary embodiment of a valve designed according to the present invention in a detail of a cutaway sectional schematic diagram.

FIG. 1 shows a section through a detail of an electromagnetically operated valve according to the present invention, e.g., a fuel injection valve, in a schematic diagram. A core 3 of a ferritic or ferromagnetic material has a tubular design and is surrounded by a magnet coil 2. Core 3 has a longitudinal axial bore 4 with a fluid such as a fuel flowing through it. The direction of flow is indicated by arrow 5. On its downstream end, core 3 has an end face 6 which is opposite an upstream end face 7 of an armature 8. In the resting position of electromagnetically operated valve 1 illustrated in FIG. 1, a gap 9 is formed between downstream end face 6 of core 3 and upstream end face 7 of armature 8. When magnet coil 2 is energized by an electric current, upstream end face 7 of armature 8 is pulled toward downstream end face 6, so that end face 7 of armature 8 comes to a stop against end face 6 of core 3. A valve closing body (not shown in FIG. 1) connected to armature 8 lifts away from a valve seat (not shown), so that valve 1 opens. The valve closing body (not shown) can be connected to armature 8 by a valve needle 15, which is indicated only schematically.

To operate valve 1, magnet coil 2 generates a magnetic flux, passing from core 3 across gap 9 into armature 8, and then going radially from armature 8 to a reflux body 10 surrounding armature 8. In the embodiment illustrated in FIG. 1, reflux body 10 is designed in one piece with core 3 through an isolation point 12 to be described in greater detail below. Furthermore, a guide element 11 is provided, which returns the magnetic reflux to core 3. Core 3, armature 8, reflux body 10 and guide element 11 form a closed magnetic flux circuit. Isolation point 12 also has a sealing function to insulate and hydraulically seal the fluid flowing in longitudinal bore 4 of core 3 with respect to an annular space 13 accommodating magnet coil 2. The fluid may be guided through radial grooves provided on end face 7 of armature 8 to a gap 14 radially surrounding armature 8 to flow further in the direction of the valve seat. On the other hand, armature 8 may itself have flow holes or grooves running directly axially.

According to the present invention, isolation point 12 is designed of the same ferritic or ferromagnetic material as core 3 and reflux body 10, so that isolation point 12 may be designed in one piece with core 3 and/or reflux body 10 without requiring an additional intermediate part, e.g., made of a nonmagnetic metal or a plastic material, for isolation point 12. To prevent a magnetic short circuit between core 3 and reflux body 10, however, isolation point 12 may transfer little or no magnetic flux from core 3 directly to reflux body 10, bypassing armature 8. Therefore, it is proposed according to the present invention that core 3 and/or reflux body 10 be made of a ferritic or ferromagnetic material whose permeability depends on the mechanical stress in the material, and core 3 and reflux body 10 be mechanically deformed in a boundary area between core 3 and reflux body 10 to form magnetic isolation point 12. The material of core 3 and/or reflux body 10 is preferably subjected to plastic deformation in the area of magnetic isolation point 12 so that the material is under an inherent mechanical stress in the area of isolation point 12, thereby greatly reducing the permeability with respect to the stress-free state of the material.

Figure 2:
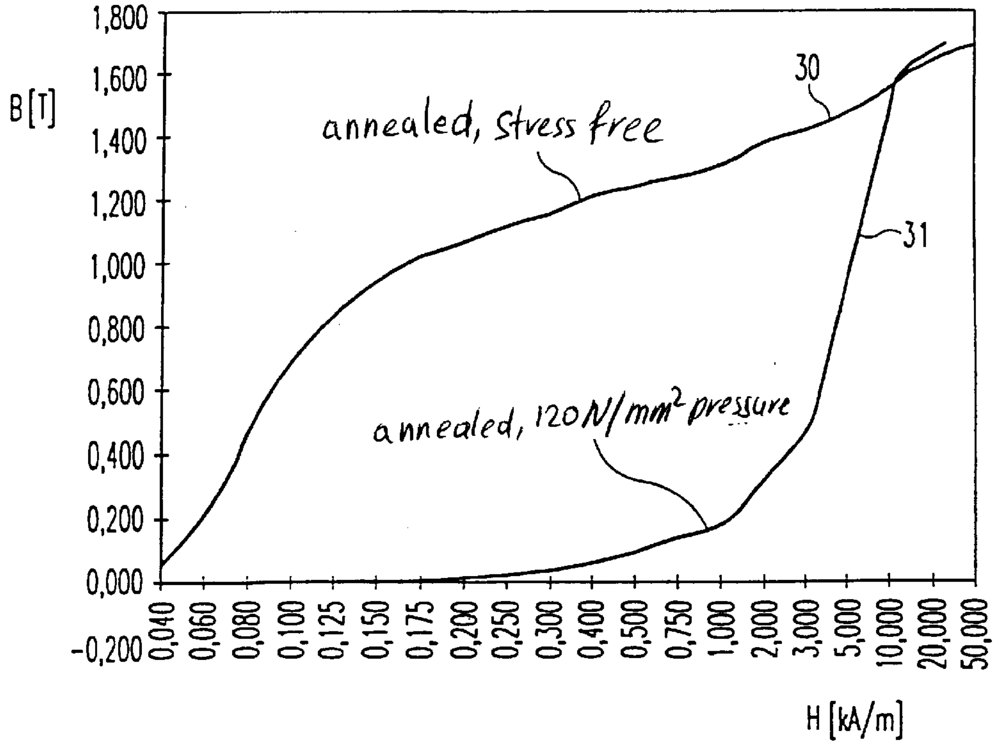
FIG. 2 shows a magnetic induction B as a function of magnetic field strength H for a preferred material.

To illustrate the present invention, FIG. 2 shows magnetic induction B as a function of magnetic field strength H as an example of a preferred material for core 3, reflux body 10 and isolation point 12. The quotient of magnetic induction B and magnetic field strength H yields the permeability according to a known equation:

$$\mu = B/H.$$

The functional relationship shown here between magnetic induction B and magnetic field strength H is based on the commercially available ferritic magnetic material DMER 1F (K-M35FL). Other ferritic or ferromagnetic materials are of course also suitable for carrying out this invention. The magnetic material represented by curve 30 was only subjected to final annealing. The magnetic material according to curve 31, however, was exposed to a mechanical stress of 120 N/mm$^2$ after final annealing. A comparison of the two curves shows that permeability $\mu$ is relatively low for the magnetic material exposed to a mechanical stress in the range of magnetic field strength H below 1.0 kA/m, but it increases significantly only in the range above 1.0 kA/m. For the stress-free magnetic material, however, a much greater permeability $\mu$ is obtained in a range of magnetic field strength H below 10 kA/m in comparison with the magnetic material exposed to a mechanical stress.

The present invention utilizes this inasmuch as the material is mechanically deformed at mechanical isolation point 12 to reduce permeability and thus to reduce flux density at a given field strength. Preferably, this mechanical deformation is achieved by plastic deformation of the material in the area of isolation point 12, e.g., by caulking, pressing or stamping, so that the material is under an inherent mechanical stress. The advantage is in particular that no separate part is required for isolation point 12, but instead isolation point 12 can be manufactured from the same ferritic or ferromagnetic material of which core 3 and/or reflux body 10 is made. Core 3 and reflux body 10 may therefore be integrally joined to isolation point 12 to form a one-piece combined part. Isolation point 12 has a relatively high magnetic resistance and reduces the magnetic short-circuit flux between core 3 and reflux body 10. At the same time, isolation point 12 guarantees a hydraulic seal of annular space 13 accommodating magnet coil 2 with respect to the fluid flowing through valve 1 according to the present invention.

Figure 3:
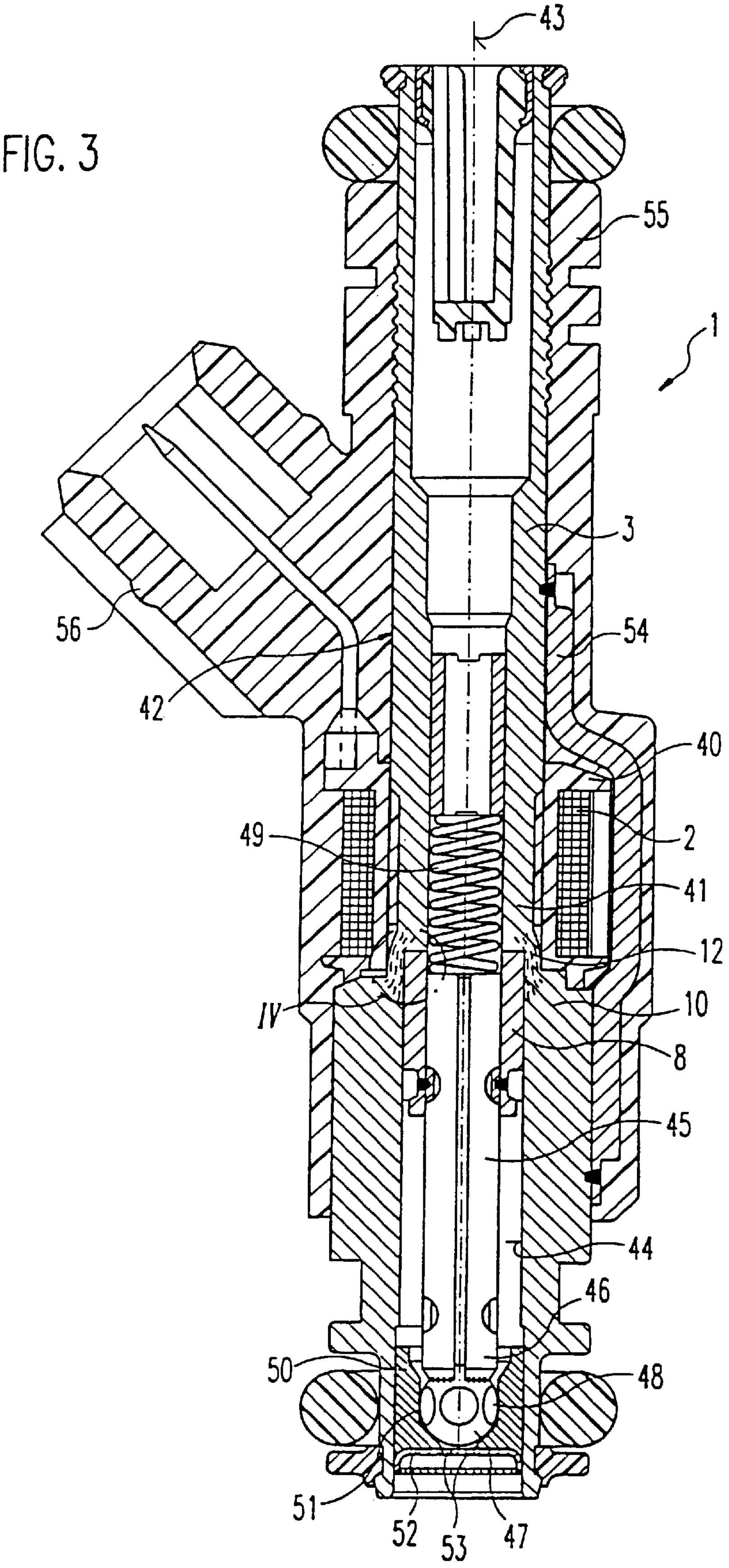
FIG. 3 shows a second exemplary embodiment of a valve designed according to the present invention in a sectional diagram.

FIG. 3 shows an exemplary embodiment of an electromagnetically operated valve 1 according to the present invention in the form of a fuel injection valve for fuel injection systems of internal combustion engines with compression of the fuel-air mixture and with spark ignition. Elements already described with reference to FIG. 1 are provided with the same reference numbers here to facilitate an assignment.

Electromagnetically operated valve 1 illustrated in FIG. 3 in the form of a fuel injection valve has a tubular core 3 surrounded by a magnet coil 2, which serves as a fuel inlet connection also known as an internal pole. A bobbin 40 accommodates a winding of magnet coil 2. Core 3 is not designed as a part that actually ends with a core end 41, as with the fuel injection valves according to the related art, but instead core 3 continues over magnetic isolation point 12 in the downstream direction, so that a tubular connection point which is arranged downstream from bobbin 40 and is hereinafter referred to as reflux body 10 is designed as an outside pole in one piece with core 3, with the resulting combined part being labeled as valve tube 42. Valve tube 42 has a magnetic isolation point 12 as the transition from core 3 to reflux body 10.

Magnetic isolation point 12 extends out of lower core end 41 of core 3 concentrically with a longitudinal axis 42 of the valve around which core 3 and reflux body 10 also extend concentrically. In this area directly downstream from core end 41, metallic nonmagnetic intermediate parts are provided in the known fuel injection valves to ensure a magnetic isolation between core 3 and reflux body 10. This ensures that with the known fuel injection valves, the magnetic flux will flow around the magnetic intermediate part in the electromagnetic circuit through armature 8. The fuel injection valve is operated electromagnetically in the conventional manner also with the arrangement according to the present invention.

A longitudinal bore 44 which is concentric with longitudinal axis 43 of the valve runs in reflux body 10. A valve needle 45 which is tubular, for example, is arranged in longitudinal bore 44 and is connected by welding, for example, at its downstream end 46 to a spherical valve closing body 47 having, for example, five flats 48 on its periphery to allow the fuel to flow past.

The electromagnetic circuit with magnet coil 2, core 3 and armature 8 provides for the axial movement of valve needle 45 and thus for opening the injection valve against the spring force of a restoring spring 49 or for closing it. Armature 8 is connected to the end of valve needle 45 facing away from valve closing body 47 by a weld and is aligned with core 3. A cylindrical valve seat body 50 having a valve seat that interacts with valve closing body 47 is tightly mounted in longitudinal bore 44 by welding in the downstream end, facing away from core 3, of reflux body 10, which also serves as the valve seat carrier.

A guide opening 51 in valve seat body 50 serves to guide valve closing body 47 during the axial movement of valve needle 45 with armature 8 along valve longitudinal axis 43. Spherical valve closing body 47 interacts with the valve seat of valve seat body 50; the valve seat is tapered in the form of a truncated cone in the direction of flow. On its end facing away from valve closing body 47, valve seat body 50 is fixedly joined to a spray hole disk 52, which has the shape of a pot, for example. Pot-shaped spray hole disk 52 has at least one spray opening 53, four, for example, formed by eroding or punching. With the conventional fuel injection valves, the nonmagnetic intermediate parts are used for precision guidance of armature 8 connected to valve needle 45 during the axial movement, so they must be manufactured with a high degree of precision and accuracy, e.g., on precision lathes, to achieve reduced play in guiding. Since no intermediate part is necessary with the fuel injection valve according to the present invention, it is advisable to provide at least one guide face, which is produced by turning, for example, on the outer periphery of armature 8. The guide face may be designed as a peripheral continuous guide ring or as a plurality of guide faces designed with a distance between them on the periphery.

The depth of insertion of valve seat body 50 with pot-shaped spray hole disk 52 determines the size of the lift of valve needle 45. The end position of valve needle 45 when magnet coil 2 is not energized is determined by the valve closing body 47 coming to rest against the valve seat of valve seat body 50, while the other end position of valve needle 45 when magnet coil 2 is energized is determined by armature 8 coming to rest against end 41 of the core. Magnet coil 2 is surrounded by at least one bow-shaped guide element 54, for example, surrounding magnet coil 2 at least partially in the circumferential direction and in contact with core 3 at one end and reflux body 10 serving as the valve seat carrier on the other end, and it can be joined to them by welding, soldering or gluing, for example.

The fuel injection valve is largely surrounded by an injection-molded plastic sheathing 55 extending from core 3 in the axial direction over magnet coil 2 and the minimum of one guide element 54 to reflux body 10, with guide element 54 being covered completely axially and in the peripheral direction. This injection-molded plastic sheathing 55 includes, for example, an electric plug connector 56 which is also molded with it. The one-piece valve tube 42, which is divided into core 3, magnetic isolation point 12 and reflux body 10 extends completely over the entire length of the fuel injection valve.

Figure 4:
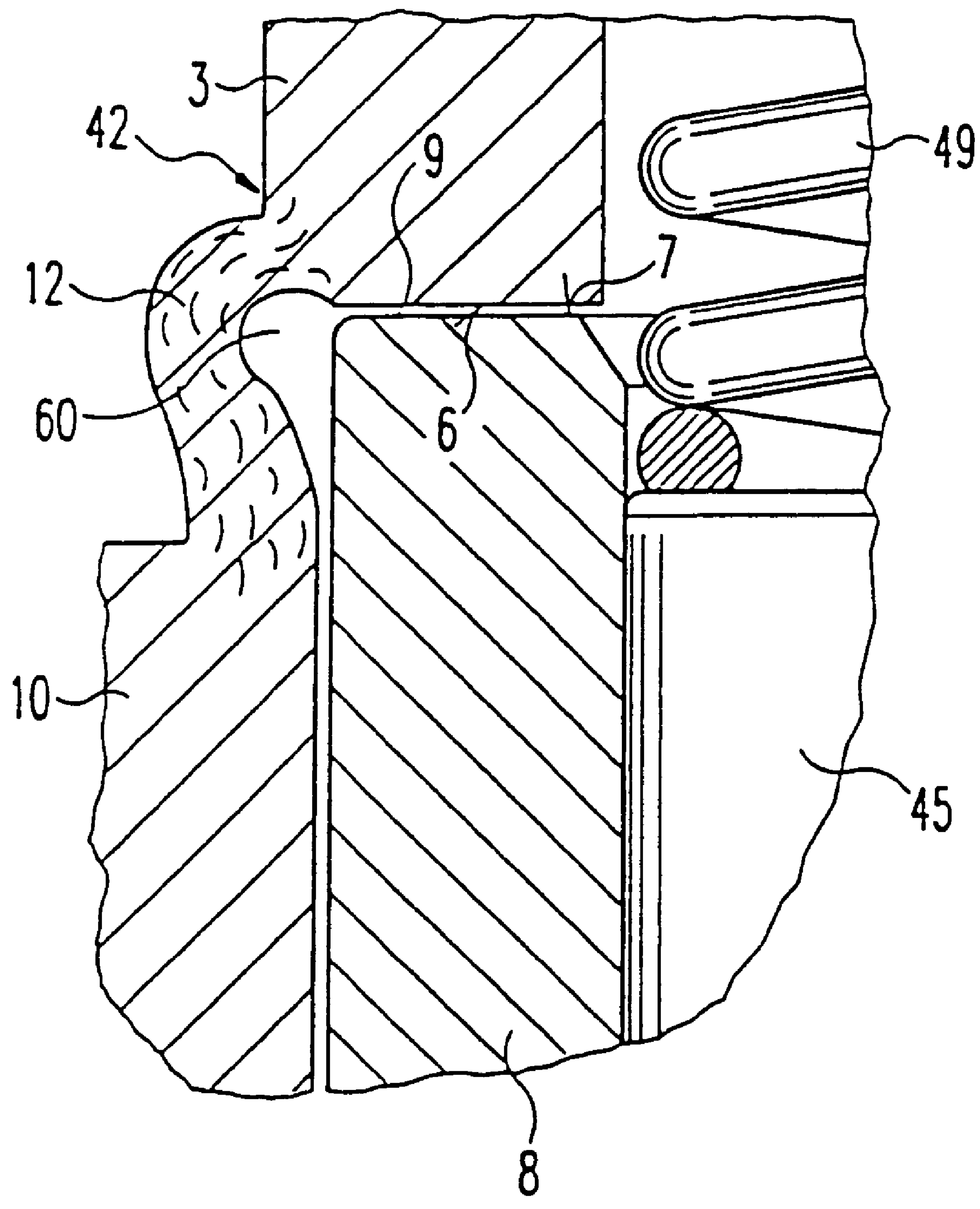
FIG. 4 shows detail IV from FIG. 3.

FIG. 4 shows an enlarged diagram of detail IV from FIG. 3.

FIG. 4 shows in particular armature 8, core 3 and reflux body 10 which is isolated from core 3 at isolation point 12. In the resting position illustrated in FIG. 4, upstream end face 7 of armature 8 and downstream end face 6 of core 3 are separated by gap 9.

FIG. 4 shows an advantageous geometric design of isolation point 12 more clearly. Isolation point 12 is shaped like a bulge by plastic deformation to produce the inherent mechanical stress. An annular recess 60 is provided between isolation point 12 and the upstream end of armature 8, and may be produced by a mold such as an embossing stamp or die. Annular recess 60 extends axially beyond gap 9 formed between core 3 and armature 8 against the direction of spray of the fuel injection valve. Annular recess 60 ensures that isolation point 12 will not come in contact with armature 8 on its radial circumference and thus will not interfere with the guidance of armature 8. In addition, this ensures that armature 8 with its upstream end face 7 will not come in contact with isolation point 12, and the size of the valve lift which is determined by gap 9 will not interfere in any way with the bulge of isolation point 12.

Many other geometric designs of isolation point 12 are of course also conceivable within the scope of the present invention.

We claim:

1. An electromagnetically operated valve, comprising:

a core;

a magnet coil surrounding the core;

a valve seat;

a valve closing body interacting with the valve seat;

an armature adjacent to the core, the armature controlling the valve closing body; and a reflux body surrounding the armature, the reflux body being magnetically isolated from the core by an isolation point, wherein at least one of the core and the reflux body is composed of a particular material, the particular material including one of a ferritic material and a ferromagnetic material, a permeability of the particular material depending on a mechanical stress to which the particular material is subjected, and wherein at least one of the core and the reflux body is under the mechanical stress in a boundary area, the boundary area being situated between the core and the reflux body and forming the isolation point.

2. The valve according to claim 1, wherein the valve is a fuel injection valve for a fuel injection system of an internal combustion engine.

3. The valve according to claim 1, wherein the particular material is under the mechanical stress, the mechanical stress being generated by a plastic deformation in the boundary area.

4. The valve according to claim 1, wherein the core and the reflux body are combined to generate a one-piece combined part, the combined part forming the isolation point by a plastic deformation.

5. The valve according to claim 4, wherein the combined part surrounds the armature on a particular end of the combined part, the particular end being adjacent to the core, the combined part forming an annular recess, the annular recess being situated radially between the isolation point and the armature.

6. The valve according to claim 5, wherein the annular recess extends axially beyond a gap, the gap being formed between the core and the armature.

7. The valve according to claim 1, wherein the reflux body includes a tube and a valve seat carrier, the valve seat carrier carrying a valve seat body, the valve seat being formed on the valve seat body.

8. The valve according to claim 1, further composing:

at least one guide element joining the reflux body and the core, the at least one guide element surrounding the magnet coil, wherein the core, the armature, the reflux body and the at least one guide element form a closed magnetic flux circuit.

* * * * *